United States Patent [19]
Yamanoue

[11] Patent Number: 5,659,488
[45] Date of Patent: Aug. 19, 1997

[54] SHADING CORRECTING CIRCUIT AND METHOD FOR CORRECTING AN IMAGE DENSITY SIGNAL ON THE BASIS OF A REFERENCE SIGNAL

[75] Inventor: Masafumi Yamanoue, Yao, Japan

[73] Assignee: Sharp Kabushiki Kaisha, Osaka, Japan

[21] Appl. No.: 489,019

[22] Filed: Mar. 6, 1990

[30] Foreign Application Priority Data

Mar. 6, 1989 [JP] Japan .................................. 1-53345

[51] Int. Cl.$^6$ ................................................. H04N 1/00
[52] U.S. Cl. ................................... 358/461; 348/251
[58] Field of Search ...................... 364/518, 521, 364/522; 395/126; 358/461; 348/251; 382/274

[56] References Cited

U.S. PATENT DOCUMENTS

| | | | |
|---|---|---|---|
| 4,523,229 | 6/1985 | Kanmoto | 348/251 |
| 4,879,598 | 11/1989 | Seto | 348/164 |
| 4,945,405 | 7/1990 | Hirota | 358/516 |

FOREIGN PATENT DOCUMENTS

| | | |
|---|---|---|
| 60-124176 | 7/1985 | Japan . |
| 61-37576 | 10/1986 | Japan . |

*Primary Examiner*—Paul V. Kulik

[57] ABSTRACT

The shading correction is performed with respect to a signal "A" indicative of the image density read by an optical read device in accordance with a reference signal "B". Both the signals "A" and "B" consist of n bits. An inputted signal having an initial value "A" is doubled by a multiplier when $A=B$ and $B \neq 0$. A subtracter subtracts the reference signal "B" from a signal "X" outputted from the multiplier and discriminates whether or not a signal "X–B" is negative. An S/P conversion register doubles an integrated value "S" having an initial value "0" and changes the integrated value from "S" to "2S" when the signal "X–B" is negative. In contrast, when the signal "X–B" is not negative the S/P conversion register adds "1" to "2S" and changes the integrated value from "S" to "2S+1". The signal "X" outputted from the multiplier is again inputted into the multiplier when the signal "X–B" is negative. Alternatively, the multiplier receives the signal "X–B" outputted from the subtracter when the signal "X–B" is not negative. The, above procedure is repeated n times. The last integrated value outputted from the S/P conversion register is equal to or approximately equal to a value obtained by an expression "$S=A(2^n-1)/B$", and therefore, the former can be regarded as a shading correction signal.

4 Claims, 3 Drawing Sheets

SHADING CORRECTING CIRCUIT AND METHOD FOR CORRECTING AN IMAGE DENSITY SIGNAL ON THE BASIS OF A REFERENCE SIGNAL

BACKGROUND OF THE INVENTION

1. Field of the Invention

The present invention relates to a shading correcting method for correcting a signal A indicative of the image density read by an optical read device on the basis of a reference signal B.

2. Description of the Prior Art

The process of recovering uneven gradation characteristics of a signal read by an optical read device to a correct density level is generally called "shading correction". Such unevenness is caused by photoelectric conversion characteristics which vary according to the image position in a screen of the optical read device. A signal S to be obtained by the shading correction is given by an expression $S=A(2^n-1)/B$, where A, B and n represent a signal read by the optical read device, a reference signal in a certain region of the screen in which the signal A is obtained, and a bit accuracy for correction, respectively. The operation is performed with respect to the above expression in a manner as shown in FIG. 1. More specifically, when the signal A is, for example, data of three bits (n=3), the signal A is inputted as a column address designation signal into a ROM 11, while the reference signal B consisting of data of three bits is inputted as a row address designation signal. These signals designate an address in which a value obtained by the expression $A \cdot 7/B$ or an approximate value thereof is stored in advance. This value is outputted as a shading correction signal S. Accordingly, as shown in FIG. 2, when the reference signal B equals 7, the signal A is outputted as it is as the correction signal S. When the reference signal B equals 4, 7 is outputted as the correction signal S if the signal A is greater than or equal to 4. On the other hand, if the signal A is 3, 2, 1 or 0 when the reference signal B equals 4, the correction signal to be outputted is 6, 5, 4 or 3, respectively.

In the above-described conventional method, however, the shading correction is performed not by the operation using the signals A and B, but on the basis of a table, which results from the operation and is stored in advance in the ROM 11. A desired value in the table is outputted by designating the column and row addresses using the signals A and B. Accordingly, the conventional method is disadvantageous in that an IC for exclusive use (ASIC), which cannot accommodate any ROM requires an additional external ROM or ROMs. Furthermore, if the operation results to be stored have to be improved in bit accuracy using an IC which can accommodate the ROM, a memory area is required to be doubled for the increase of each one bit, thus causing the ROM to be enlarged in capacity.

SUMMARY OF THE INVENTION

The present invention has been developed to substantially eliminate the above-described disadvantages inherent in the prior art method of correcting the shading. Accordingly, an essential object of the present invention is to provide an improved method capable of effectively performing the shading correction using a simple operation circuit which requires no ROM having a large capacity.

In accomplishing this and other objects, according to the present invention, the shading correction is performed with respect to a signal "A" of n bits indicative of an image density read by an optical read device on the basis of a reference signal "B" of n bits.

The method according to the present invention includes the steps of:

(a) causing a multiplying means to double an inputted signal having an initial value "A" when $A \leq B$ and $B \times 0$;

(b) causing a subtracting means to subtract the reference signal "B" from a signal "X" outputted from the multiplying means;

(c) causing a discriminating means to discriminate whether or not a signal "X–B" outputted from the subtracting means is negative;

(d) causing an integrating means to double an integrated value "S" having an initial value "0";

(e) changing the integrated value from "S" to "2S" when the signal "X–B" is negative, or adding "1" to "2S" and changing the integrated value from "S" to "2S+1" when the signal "X–B" is not negative;

(f) inputting the signal "X" outputted from the, multiplying means into the multiplying means when the signal. "X–B" is negative, or inputting the signal "X–B" outputted from the subtracting means into the multiplying means when the signal "X–B" is not negative; and (g) repeating n times an operation loop from steps (b) to (f).

In the above-described method, the last integrated value outputted from the integrating means is equal to or approximately equal to a value obtained by an expression "$S=A(2^n-1)/B$". Accordingly, the last integrated value can be regarded as the shading correction signal "$S=A(2^n-1)/B$".

BRIEF DESCRIPTION OF THE DRAWINGS

This-and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figures 1, 2:
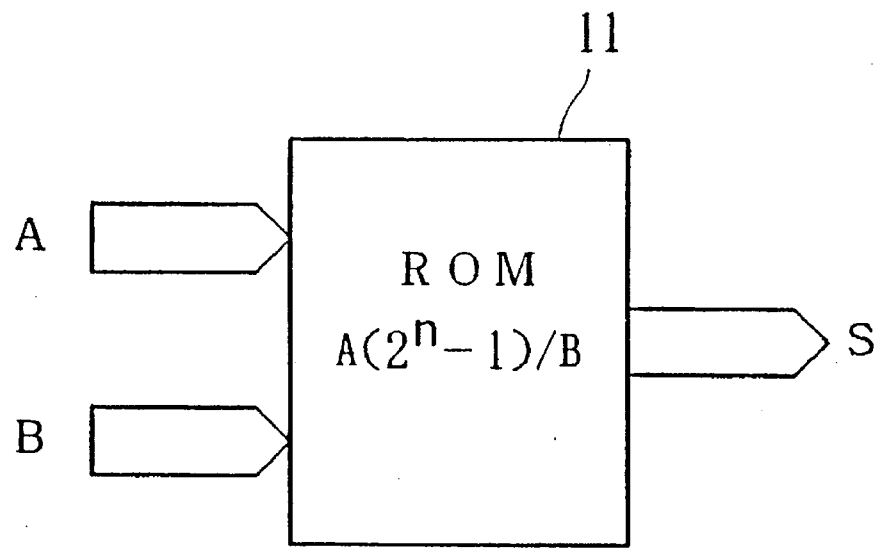
FIG. 1 is a block diagram for performing the conventional shading correcting operation.
FIG. 2 is a table to be used in the conventional shading correcting operation.
Figure 3:
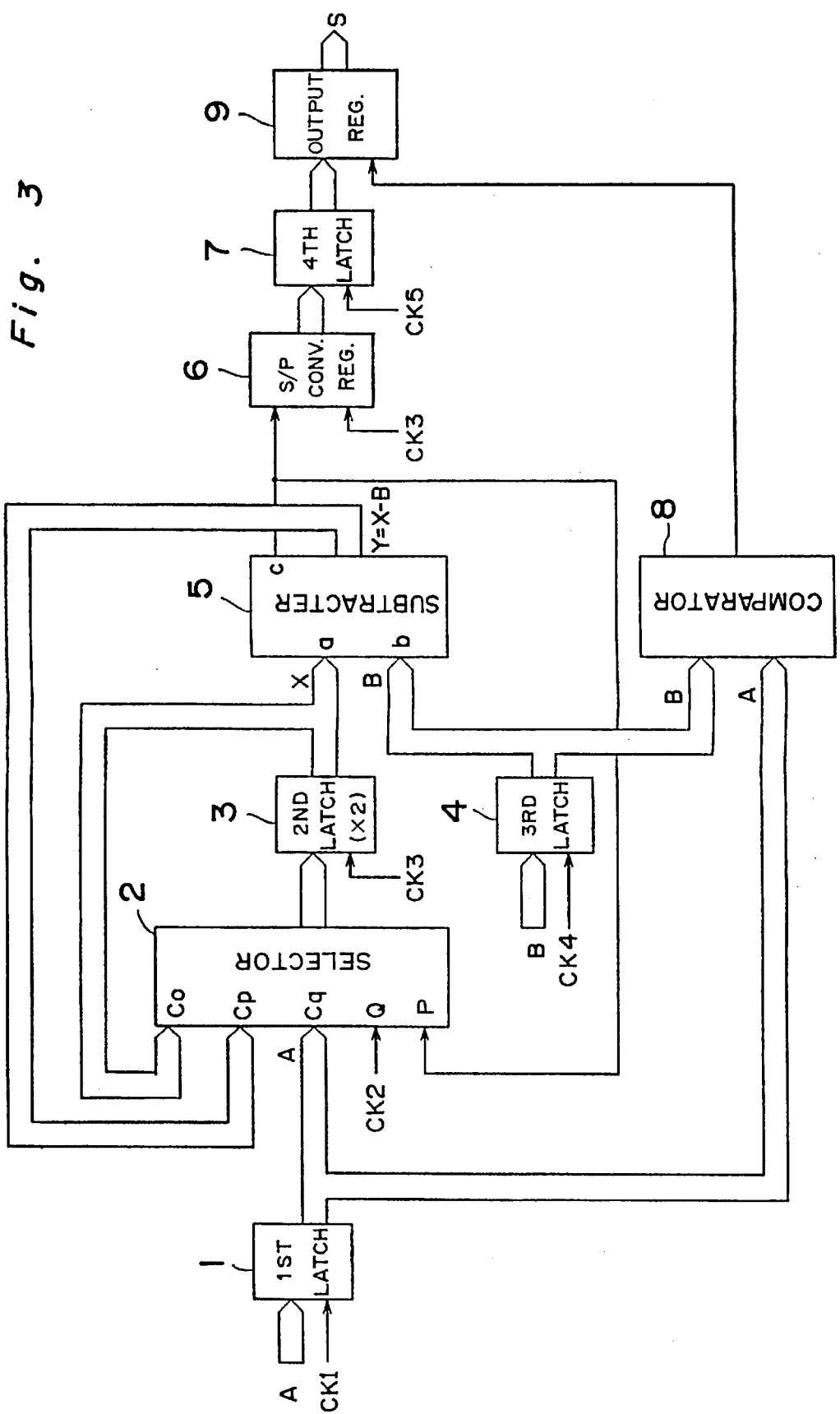
FIG. 3 is a block diagram of one example of an operation circuit for effecting a shading correcting method according to the present invention.

Referring now to the drawings, there is shown in FIG. 3 a block diagram indicative of an example of an operation circuit for effecting a method according to the present invention. The operation circuit includes a first latch 1, a selector 2, a second latch 3, a third latch 4 and a subtracter 5. The first latch 1 is provided for sequentially storing therein a signal A of n bits indicative of the image density read by an optical read device when a clock signal CK1 is received. The selector 2 outputs data inputted through input terminals thereof Cp and Cq when the selector 2 has received control signals through control terminals thereof P and q, respectively, and outputs data inputted through an input terminal thereof Co when the selector 2 has not received a control signal. The second latch 3 is used as a multiplier for doubling the data outputted from the selector 2 whenever a clock signal CK3 having a frequency n times greater than that of the clock signal CK1 is received. The second latch 3 outputs such data to the input terminal Co of the selector 2. The third latch 4 is provided for sequentially storing therein a reference signal B of n bits inputted from a RAM (not shown) when a clock signal CK4 having the same frequency as that of the clock signal CK1 is received. The subtracter 5 subtracts the data B outputted from the third latch 4 to an input terminal (b) thereof from data X outputted from the second latch 3 to an input terminal (a) thereof. The subtracter 5 serves both as a subtracting device for outputting a value (Y=X−A) obtained by the subtraction to the input terminal Cp of the selector 2 and a discriminating device for outputting a signal "0" from an output terminal thereof (c) when the subtraction result is negative and a signal "1" when the subtraction result is not negative. The signal "1" is outputted as a control signal to the control terminal P of the selector 2.

The operation circuit further includes an S/P serial-parallel conversion register 6, a fourth latch 7, a comparator 8 and an output register 9. The S/P conversion register 6 serves as an integrating device for doubling an integrated value S-having an initial value "0" and adding the output signal "0" or "1" of the subtracter 5 to the value "2S" in synchronization with the clock signal CK3 inputted into the second latch 3. The fourth latch 7 latches data of n bits inputted thereinto from the S/P conversion register 6 and outputs the data whenever a clock signal CK5 having the same frequency as that of the clock signal CK1 is received. The comparator 8 compares the signal A received from the first latch 1 and the reference signal B received from the third latch 4 with each other. The comparator 8 discriminates whether or not A≦B and B≠0, and outputs an instruction signal when the discrimination result is NO. The output register 9 outputs a shading correction signal $S(=2^n-1)$ of n bits for indicating that specified conditions are not satisfied when the instruction signal from the comparator 8 is received. In contrast, when no instruction signal is received, the output register 9 outputs data of n bits inputted from the fourth latch 7 as a shading correction signal $S=A(2^n-1)/B$).

It is noted that the clock signal CK2 to be inputted into the control terminal Q of the selector 2 has the same frequency as that of the clock signal CK1 and synchronizes therewith. When the clock signal CK1 causes the first latch 1 to latch the signal A, the signal A enters the selector 2 through the input terminal Cq and is doubled in the second latch 3. After the output of the second latch 3 has been again inputted into the selector 2 through the input terminal Co, the first pulse of the clock signal CK3 is inputted into the second latch 3.

Figure 4:
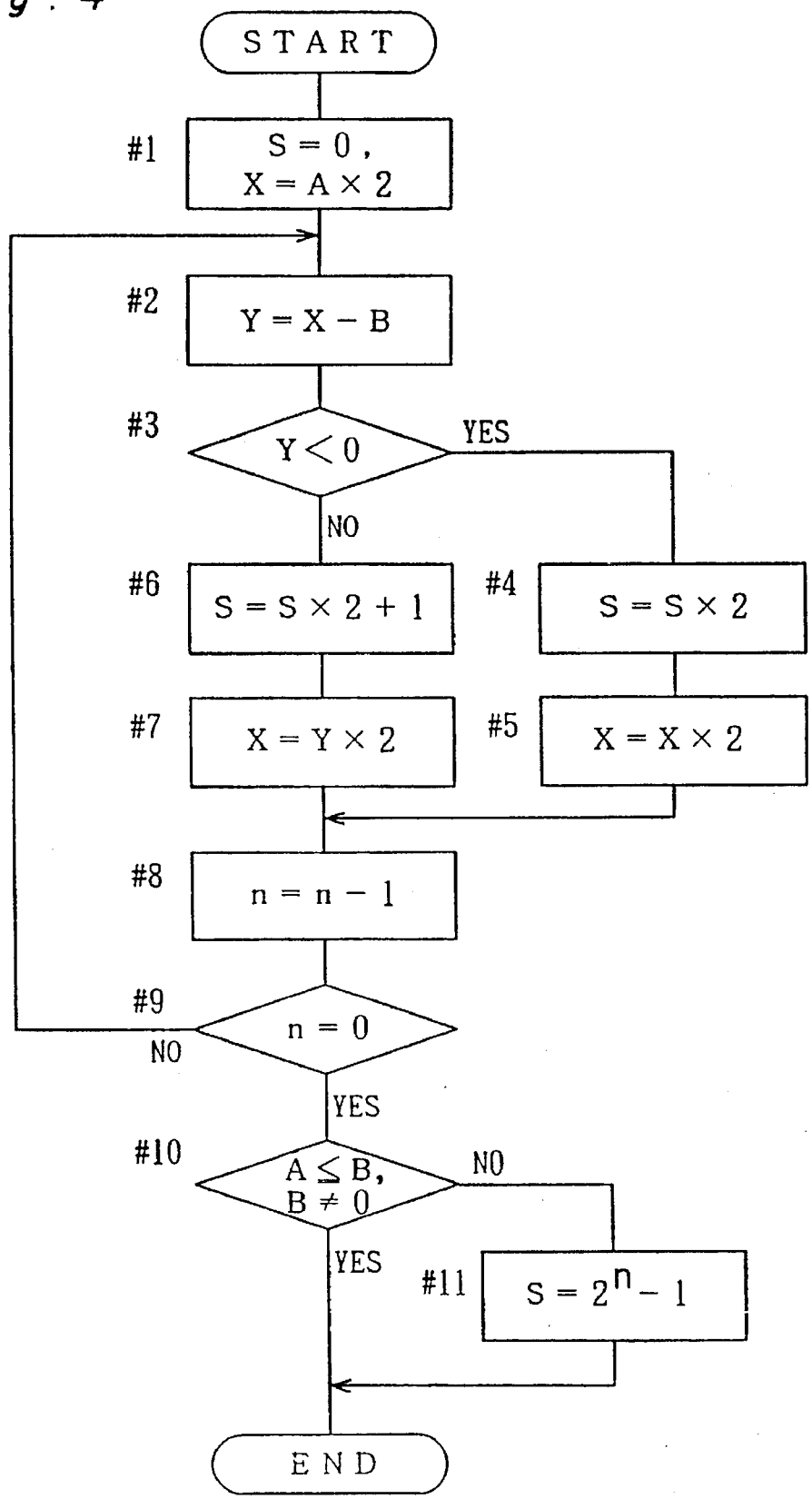
FIG. 4 is a flow-chart indicative of the shading correcting method according to the present invention.

The method according to the present invention is executed in the above-described operation circuit in accordance with a flow-chart as shown in FIG. 4.

It is now assumed that the clock signals CK1 and CK4 cause the first and third latches 1 and 4 to latch the signal A and the reference signal B, respectively, on condition that both the signals A and B consist of n bits and A≦B and B≠0. The clock signal CK2 which synchronizes with the clock signal CK1 causes the signal A latched by the first latch 1 to enter the selector 2 through the input terminal Cq. The signal A is then inputted into and doubled in the second latch 3 so that data X may become 2A. The data X is outputted from the second latch 3 into the input terminal (a) of the subtracter 5 and into the input terminal Co of the selector 2. On the other hand, the reference signal B latched by the third latch 4 is outputted to the input terminal (b) of the subtracter 5.

The process as described above corresponds to step #1 in the flow-chart of FIG. 4.

It is noted that an integrated value S is initially set to zero at step #1.

At step #2, the subtracter 5 subtracts the data B from the data X and outputs the subtraction result Y (Y=X−B) to the input terminal Cp of the selector 2. It is judged at step #3 whether or not the data Y is negative. If the data Y is negative, the subtracter 5 outputs "0" from the output terminal (c) thereof. In contrast, if the data Y is not negative, the subtracter 5 outputs "1".

If "0" is outputted from the output terminal (c) of the subtracter 5, the S/P conversion register 6 receives the first pulse of the clock signal CK3 at step #4. In this event, the integrated value S is doubled and a new integrated value 2S is obtained. Furthermore, the input terminal Co of the selector 2 is selected because "0" is also inputted into the control terminal P of the selector 2 while the control terminal Q the selector 2 receives no clock signal. At step #5, the previous output X of the second latch 3 is again inputted into the second latch 3 through the selector 2 and is doubled by the first pulse of the clock signal CK3.

On the other hand, if "1" is outputted from the output terminal (c) of the subtracter 5, the first pulse of the clock Signal CK3 causes the S/P conversion register 6 to double the integrated value S and to add "1" to "2S" so that a new integrated value "2S+1" may be obtained at step #6. When "1" is inputted into the control terminal P of the selector 2 and the input terminal Cp of the selector 2 is selected, the previous output (Y=X−B) of the subtracter 5 is inputted into the second latch 3 through the selector 2. In this event, the first pulse of the clock signal CK3 causes the second latch 3 to double the output (Y) of the selector 2 so that "X" may be equal to "2Y" at step #7.

Upon completion of step #5 or #7, "1" is subtracted from "n" at step #8 followed by step #9 at which time it is judged whether or not "n" equals zero. More specifically, the subtracting and discriminating process (steps #2 and #3) by the subtracter 5, the integrating process (steps #4 and #6) by the S/P conversion register 6, and the multiplying process (step #5 and #7) by the second latch 3 are repeated n times, which corresponds to the number of the pulse of the clock signal CK3 with respect to one pulse of the clock signal CK1.

Upon completion of the procedure from step #2 to step #9, the clock signal CK5 is inputted into the fourth latch 7 and causes the fourth latch 7 to latch the last integrated value S of the S/P conversion register 6.

It is judged at step #10 whether or not A≦B and B≠0. As previously described, since both the signals A and B satisfy such conditions, the comparator 8 outputs no instruction signal to the output register 9. Accordingly, the last integrated value S latched by the fourth latch 7 is outputted as the shading correction signal of n bits from the output register 9 and is equal to or approximately equal to a value obtained by the expression $S=A(2^n-1)/B$. On the other hand, if the judgment at step #10 is NO, the comparator 8 outputs an instruction signal to the output register 9 so that another shading correction signal of n bits expressed by $S=2^n-1$ is outputted from the output register 9 at step #11. When the shading correcting operation is completed in this way with respect to a certain signal A, all the latches 1, 3, 4 and 7 and the registers 6 and 9 are cleared to zero. Subsequently, the shading correcting operation is again performed on the basis of a newly inputted signal A and the reference signal B.

One example of the above-described method will be explained hereinafter in the case of n=4, $A(0100)_2=4$ and $B=(0110)_2=6$.

In the flow-chart of FIG. 4, S=0 and X=2A=8 at step #1 followed by step #2 at which Y=X−B=2. It is then judged at step #3 whether or not Y<0. Since Y>0, the procedure proceeds to step #6 at which S=2S+1 =1. Subsequently, X=2Y=4 at step #7 followed by step #8 at which "1" is subtracted from "n" and the new "n" becomes 3. Accordingly, the procedure returns from step #9 to step #2.

In the second loop, since Y=−2, it is judged at step #3 that y<0 and the procedure proceeds to step #4 at which S=2S=2.

Likewise, S=5 in the third loop and S=10 in the fourth loop.

In the fourth loop, however, it is judged at step #9 that n=0 and the procedure proceeds to step #10. Since the conditions at step #10 are satisfied, the procedure is terminated. Accordingly, S=10 is obtained as the last integrated value. It should be particularly noted that this value equals a value obtained by the expression $S=A(2^n-1)/B$ in the case of n=4, A=4 and B=6.

In all other cases, the last integrated value S obtained in the operating circuit of FIG. 3 is equal to or approximately equal to a value obtained by the expression $S=A(2^n-1)/B$.

From the foregoing, the method according to the present invention does not require any ROM having a large capacity for storing operation results in a table in advance, unlike the conventional method. The method according to the present invention can effectively perform the shading correction by speeding the operation up using the simple operating circuit as shown in FIG. 3.

It is noted that in the above-described embodiment, although the shading correction is performed with respect to an inputted signal A of 4 bits, the signal A may consist of n bits.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A shading correcting method of correcting a signal "A" indicative of an image density of a signal read by an optical read device in accordance with a reference image density signal "B", both the signals "A" and "B" including n bits, n being an integer, said method comprising the steps of:

(a) receiving the image density signal read from an optical read device;

(b) doubling the received image density signal having an initial image density value "A" when the image density of A≦B and the image density of B≠0, and outputting a resultant signal "X";

(c) subtracting the reference image density signal "B" from the resultant signal "X" and outputting a resultant signal "X−B"

(d) determining whether or not the resultant signal "X−B" is negative;

(e) changing an integrated value "S", having an initial value "0", from "S" to "2S" when the resultant signal "X−B" is determined to be negative, and changing the integrated value from "S" to "2S+1" when the resultant signal "X−B" is not determined to be negative;

(f) doubling the resultant signal "X" output in step (b) when the signal "X−B" is determined to be negative, and doubling the resultant signal "X−B"; when the signal "X−B" is not determined to be negative; and (g) repeating steps (c)–(f) n times; and (h) producing, as a last integrated value of step (e), a resultant shading correction signal with a value "A $(2^n-1)/B$".

2. The method according to claim 1, wherein said last integrated value is obtained by an expression "$S=2^n-1$" when A>B or B=0.

3. A shading correcting circuit for correcting a signal "A" indicative of an image density of a signal read by an optical read device in accordance with a reference image density signal "B", both the signals "A" and "B" including n bits, n being an integer, said circuit comprising:

input means for receiving the image density signal read from an optical read device;

multiplying means for multiplying the received image density signal having an initial value "A" when the image density of A≦B and the image density of B≠0, and outputting a resultant signal "X";

subtracting means, operatively connected to the multiplying means, for subtracting the reference image density signal "B" from resultant signal "X" and outputting a resultant signal "X−B";

discriminating means, operatively connected to the input means, multiplying means, and subtracting means, for determining whether or not resultant signal "X−B" outputted from said subtracting means is negative; and integrating means, operatively connected to the subtracting means and the discriminating means, for doubling an integrated value "S" having an initial value "0", said integrating means changing, and subsequently outputting, the integrated value from "S" to "2S" when the signal "X−B" is determined to be negative, and changing, and subsequently outputting, the integrated value from "S" to "2S+1" when the signal "X−B" is not determined to be negative, said discriminating means outputting the signal "X" to the multiplying means upon determining the signal "X−B" to be negative, and outputting the signal "X−B" to the multiplying means upon not determining the signal "X−B" to be negative, said operation of the multiplying, subtracting, discriminating and integrating means continuing for n times, to produce a last integrated value outputted from said integrating means, upon completion of n times of operation, as a resultant shading correction signal "A$(2^n-1)$B".

4. The apparatus of claim 3, wherein said last integrated value is obtained by an expression "$S=2^n-1$" when A>B or B=0.

* * * * *